United States Patent
Betenekov et al.

US006337055B1

(10) Patent No.: US 6,337,055 B1
(45) Date of Patent: Jan. 8, 2002

(54) INORGANIC SORBENT FOR MOLYBDENUM-99 EXTRACTION FROM IRRADIATED URANIUM SOLUTIONS AND ITS METHOD OF USE

(75) Inventors: N. D. Betenekov; E. I. Denisov; T. A. Nedobukh, all of Ekaterinburg; L. M. Sharygin, Zarechnuy, all of (RU)

(73) Assignee: TCI Incorporated, Albuquerque, NM (US)

( * ) Notice: Subject to any disclaimer, the term of this patent is extended or adjusted under 35 U.S.C. 154(b) by 0 days.

(21) Appl. No.: 09/489,415

(22) Filed: Jan. 21, 2000

(51) Int. Cl.$^7$ ............................................... C22B 34/00
(52) U.S. Cl. ........................................................ 423/2
(58) Field of Search ................................. 423/2, DIG. 7

(56) References Cited

U.S. PATENT DOCUMENTS

| | | | | |
|---|---|---|---|---|
| 4,017,583 A | * | 4/1977 | Motojima et al. | 423/2 |
| 4,587,232 A | * | 5/1986 | Kawamura et al. | 502/400 |
| 4,738,874 A | * | 4/1988 | Berardo et al. | 427/244 |
| 4,981,658 A | * | 1/1991 | Ali et al. | 423/2 |
| 5,508,010 A | * | 4/1996 | Sameh et al. | 423/2 |
| 5,774,782 A | * | 6/1998 | Mirzadeh et al. | 423/2 |
| 5,821,186 A | * | 10/1998 | Collins | 502/8 |
| 5,910,971 A | * | 6/1999 | Ponomarev-stepnoy et al. | 376/189 |
| 5,962,597 A | * | 10/1999 | Ponomarev-stepnoy et al. | 525/329.6 |

* cited by examiner

*Primary Examiner*—Steven Bos
(74) *Attorney, Agent, or Firm*—R. W. Becker & Associates; R. W. Becker

(57) ABSTRACT

A high radiation resistant inorganic sorbent is used for the extraction of Mo-99 from the fission byproducts of a uranyl sulfate nuclear-fueled homogeneous-solution nuclear reactor. The sorbent is a composition of hydrated titanium dioxide combined with 5 to 40 mole percent zirconium hydroxide formed into pellets and saturated with an isotope composition of uranium.

3 Claims, 2 Drawing Sheets

| Sample No. | Sorbent Composition | | | Sorption % | |
|---|---|---|---|---|---|
| | TiO$_2$ mole % | ZrO$_2$ mole % | U mg U/cm$^3$ | Mo-99 | U |
| 1 | 95 | 5 | 0 | 70 | 0.1 |
| 2 | 60 | 40 | 0 | 80 | 0.1 |
| 3 | 95 | 5 | 2 | 90 | 0.05 |
| 4 | 60 | 40 | 40 | 95 | 0.05 |

FIG. 2

INORGANIC SORBENT FOR MOLYBDENUM-99 EXTRACTION FROM IRRADIATED URANIUM SOLUTIONS AND ITS METHOD OF USE

BACKGROUND OF THE INVENTION

1. Field of the Invention

The present invention is in the field of chemical processing of irradiated nuclear fuel to extract the radioactive medical isotope molybdenum-99 (Mo-99), and in particular, relates to the extraction of Mo-99 from the fuel of a homogeneous solution nuclear reactor using an inorganic sorbent.

2. Description of the Prior Art

At the present time more than 50% of the world's annual production of radionuclides are used for medical purposes, such as for the early diagnoses of diseases and for therapy. A basic condition of the use of radionuclides in medicine is the requirement that the radiation exposure of a patient be minimal. This necessitates the use of short-lived radionuclides. A nuclide with a short half-life, however, creates difficulties in transportation and storage. The most used radionuclide for medical purposes is Mo-99 with a half-life of 66 hours. Mo-99 decay results in Tc-99 m with a half-life of 6 hours and about 140 keV of gamma ($\gamma$) energy convenient for detection. Currently, more than 70% of diagnostic examinations are performed using this radionuclide.

A number of techniques exist for the recovery of Mo-99 from various material "targets" irradiated in a nuclear reactor. Once the irradiated targets are removed from the reactor, organic agents are used to extract the Mo-99. Extraction must take place in a low radiation environment because organic extraction agents and organic ion-exchange resins have poor radiation resistance.

U.S. Pat. No. 5,910,971 describes a method and apparatus for the generation of Molybdenum-99 in the uranyl sulfate nuclear fuel of a homogeneous solution nuclear reactor. The nuclear fuel containing Molybdenum-99 is pumped through an organic sorbent for extraction of the Molybdenum-99 in a closed cycle system. U.S. Pat. No. 5,962,597, describes a particular organic sorbent for the extraction of Mo-99 from a solution nuclear reactor such as that found in the '971 patent.

The present invention details an inorganic sorbent that efficiently and selectively extracts Mo-99 from highly radioactive solutions of uranium. This sorbent has high radiation resistance permitting its use in the high radiation zone of a reactor. This facilitates a closed cycle extraction process that maintains the uranium concentration of the nuclear fuel through many Mo-99 extraction cycles while minimizing radioactive waste disposal problems. It also can potentially lower the operating costs due to the multiple reuse of the sorbent.

SUMMARY OF THE INVENTION

Mo-99 is extracted from a uranyl sulfate nuclear-fueled homogeneous-solution nuclear reactor under recirculation conditions. The reactor solution containing Molybdenum-99 is pumped through a loose layer of an inorganic sorbent that sorbs the Molybdenum-99. The inorganic sorbent is a composition of hydrated titanium dioxide containing 5 to 40 mole percent of zirconium hydroxide. It is in the form of pellets, preferably 0.1 to 2.0 mm in size, having a specific surface area of 100 to 350 $m^2/g$. The sorbent has high radiation, chemical, and mechanical resistance properties, thus allowing the sorption process to take place in the high radiation zone of the reactor.

BRIEF DESCRIPTION OF THE DRAWINGS

The various features of novelty that characterize the invention are pointed out with particularity in the claims annexed to and forming a part of this disclosure. For a better understanding of the invention, its operating advantages, and specific objects attained by its uses, reference is made to the accompanying drawing and descriptive matter in which a preferred embodiment of the invention is illustrated.

FIG. 2 is a table of the sorbent composition and the results of experiments.

DESCRIPTION OF THE PREFERRED EMBODIMENT

Figure 1:
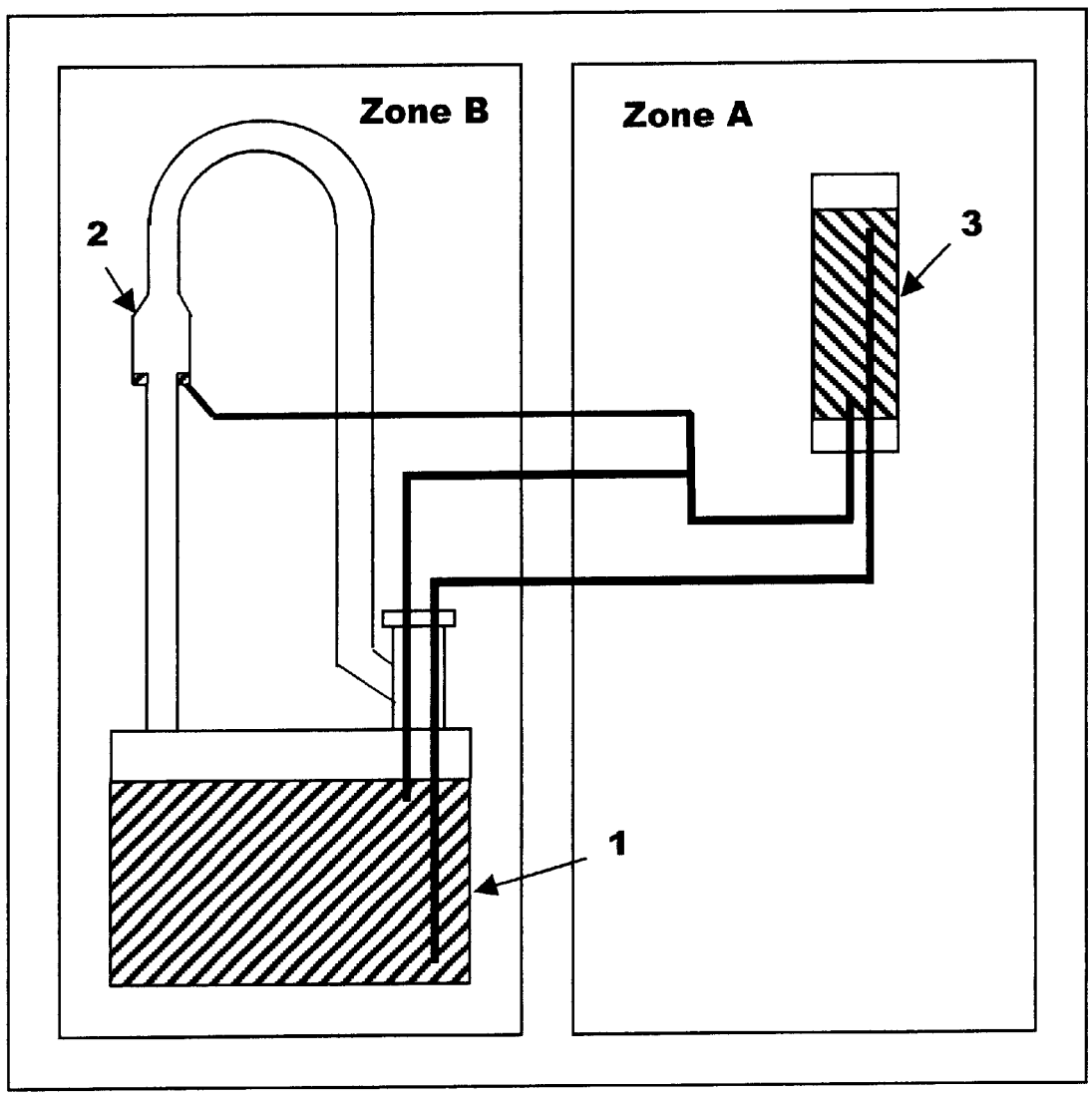
FIG. 1 diagrams the method of sorption recovery of Mo-99 from irradiated uranium solutions.

The practical significance and the applications of inorganic sorbents are primarily determined by their selectivity and by their chemical, thermal, and radiation resistance. These properties are absent in inorganic ion-exchange resins (ionites). Inorganic sorbents possessing preset properties can be selected or synthesized in many ways. The properties of inorganic sorbents depend on their composition, i.e., their structure and the degree of perfection of the crystal lattice. Service properties of sorbents are largely determined by their form, i.e., spherical particles, pellets of various types, thin films on the surface of inert materials, etc.

By their chemical composition, selective inorganic sorbents (ion-exchangers) called "thermoxides" represent hydroxides and phosphates of zirconium and titanium modified by different compounds. These filtering materials in the form of spherical pellets are characterized by high selectivity to various impurities, radiation resistance, and chemical stability. The high selectivity of the thermoxide ion-exchangers is due to the formation of chemical impurity compounds on their surface, deeper hydrolysis and polymerization of impurities in the ion-exchange phase, "zeolite" and "mesh" effects. Due to their high selectivity, the ion-exchangers have a long service life that is tens to hundreds of times longer than the service life of organic ion-exchange resins under analogous conditions. Moreover, impurities are removed almost completely from solutions and can be extracted even from mineralized (salty) solutions.

Radiation resistance is an important parameter of filtering materials used in processing nuclear materials. Organic ion-exchange resins are limited in these applications because they are weakly resistant to ionizing radiation. Thermoxide sorbents, however, possess high radiation resistance and, therefore, can be used to decontaminate highly radioactive solutions.

Thermoxide sorbents are also highly stable in the presence of oxidants, reducing agents, acids, and alkalis. Thermoxides include hydrated oxides of titanium, tin, and zirconium. They possess high selectivity to uranium and transuranium elements. They have extremely low solubility in water, even at 300° C. and pressures up to 15 MPa.

Inorganic sorbents of the thermoxide type are produced by the sol-gel method. The sol-gel process comprises the following main steps: preparation of the aqueous solution of metal chloride; electrolysis of the solution until the sol (colloidal dispersion) of hydrated metal oxide is obtained; gelatination of the sol droplets in the aqueous ammonia solution; washing and drying of gel spheres; transformation of the sorbent to the salt and modification. The sol and gel stages are separated in time during the sol-gel process. Consequently, gel spheres are formed from shaped primary particles, are mechanically strong, and have an elastic framework which precludes distortion of pellets during subsequent washing and drying. The composition and the structure of colloidal particles can be controlled at the sol stage. All these factors help to produce sorption materials in the form of strong spherical pellets possessing reproducible properties. Flexible technological processes permit the production of materials with different physical, chemical, and sorption properties.

The method of sorption recovery of Mo-99 from an irradiated uranium solution is illustrated in FIG. 1. Mo-99 is accumulated for three to five days directly in the chamber of a water-cooled reactor 1 of the Argus type designed at the Kurchatov Institute Federal Nuclear Center in Russia. The irradiated uranium solution is held for up to two or three days in the reactor to allow the decay of short-lived fission products.

The irradiated uranium solution is pumped at a filtration rate of 2 to 20 column volumes per hour from the reactor through the column 3 filled with the inorganic sorbent for the period, up to ten hours, necessary for 90 percent or more sorption extraction of Mo-99. The sorption column 3 is located in zone A, the hot well. The irradiated uranium solution (less the fission products sorbed by the column) is returned to the active zone of the reactor (zone B).

Compressed air is subsequently forced through the sorption column and then the column is washed with distilled water from zone B. These steps remove any traces of the reactor fuel solution from the sorbent column. During operation of the reactor, $H_2$ and $O_2$ radiolytic gas is formed in the reactor solution. These gases bubble to the surface of the solution and rises to a catalytic recombiner 2 where the hydrogen and oxygen are recombined to form pure steam. This is the source of the distilled water used to flush out the column. It serves to remove any reactor solution residue and returns it to the reactor. Both the reactor solution and the distilled water are processed in a closed loop system, maintaining the reactor solution close to its original state, less only the Mo-99 and traces of other fission products retained in the column by the sorbent.

The column, now containing the Mo-99-loaded sorbent (and a small amount of sorbed uranium), is disconnected from the reactor water and solution loops and moved to a third chamber (not shown) for further processing. An approximate 0.1 M solution of sulfuric acid solution wash is then used to remove any uranium hydroxide precipitate and an approximate 1.0 M nitric acid solution wash is used to desorb any sorbed uranium. These water and acid treatments do not lead to desorption of molybdenum from the sorbent. Once the uranium traces have been removed from the sorbent, the molybdenum is desorbed in an ammonia solution. The column may first be washed by an approximate 1 M ammonia solution using about 2 column volumes. An ammonia solution of about 3 to 5 M using 5 to 10 column volumes was found to maximize the molybdenum desorption at about 90%. The Molybdenum-99 in the ammonia solution is thereafter processed by standard methods.

The sorbent is hydrated titanium dioxide containing 5 to 40 mole percent of zirconium hydroxide. Additional benefits can be obtained by saturating this sorbent prior to use with sulfuric acid solutions of uranium (pH=1) at a concentration of 2 to 40 mg of uranium per cubic centimeter of the sorbent. The uranium isotope saturating composition used is similar to the isotope composition of the uranium fuel solution and has the same acidity as the reactor fuel. The use of the sorbent without pre-saturating it with uranium results in the sorption of small quantities of uranium from the reactor solution, which are subsequently removed from the sorbent. Over a number of cycles of Mo-99 extraction, this removal of uranium will result in a gradual dilution of the reactor solution. Saturating the sorbent prior to use thus reduces the dilution of the reactor solution since it minimizes further sorption of uranium from the reactor solution. Furthermore, the molybdenum selectivity of the sorbent is improved.

The uranium concentration of 2±1 mg U per cubic centimeter of the sorbent answers its full sorption capacity at the uranyl sulfate concentration of 80-g U per cubic decimeter and pH=1. This corresponds to parameters of the fuel solution used in water-cooled reactors of the Argus type. The uranium concentration of 40-mg U per cubic centimeter of the sorbent corresponds to the maximum concentration of uranium in pores of the sorbent having a 50% porosity and the aforementioned parameters of the reactor fuel solution.

The sorbent is in the form of pellets, preferably 0.1 to 2 mm in size, that have a mechanical strength of 15 MPa or better. The sorbent pellets have a specific surface of 100 to 350 $m^2/g$. These properties facilitate the efficient sorptive accumulation of Mo-99 from the reactor's solution of uranium sulfate within the hot well (zone A) of the reactor. The liquid fuel is pumped from the reactor through a loose layer of the sorbent and the filtrate is continuously returned to the active zone (zone B) of the reactor. Radiation fields may be as high as 10 to 50 Mrad.

The concentration of zirconium hydroxide (5 to 40 mole percent of the sorbent composition) provides the required optimal ratio between sorption-selective properties and the appropriate radiation, chemical, and mechanical resistance of the sorbents. The addition of less than 5 mole percent zirconium hydroxide to hydrated titanium dioxide is inefficient. It is this hydroxide that enhances selectivity of the sorbent as a whole to molybdenum. It offers the best selectivity to molybdenum in acid media among hydroxides of the elements comprising the fourth group of the Periodic Table. The addition of more than 40 mole percent zirconium hydroxide to the sorbent is inefficient because the mechanical and chemical resistance of the sorbent in sulfuric acid solutions is insufficient for use in column chromatography.

The sorbent is composed of mechanically strong pellets of approximate 0.1 to 2 mm in size and having a specific surface area of 100 to 350 $m^2/g$. This pellet size provides the highest hydrodynamic characteristics of the sorption column. The upper limit of the specific surface of 350 $m^2/g$ is determined by the nature of the sorbent itself. The lower limit of 100 $m^2/g$ was selected due to a considerable decrease in selectivity of the sorbent to Mo-99.

The reactor fuel is pumped through the sorbent column at a rate of between 2 and 20 column volumes per hour. The molybdenum recovery time takes too long at a rate lower than 2 volumes per hour and much less efficiently extracted at greater than 20 volumes per hour.

After the Mo-99 is desorbed in an ammonia solution, the sorbent can be refurbished and reused. It is again saturated with uranium having the same isotope composition as the irradiated uranium solution. The column with the thus regenerated sorbent is returned to zone A and reconnected to the liquid loops of the reactor, ready for reuse. Alternatively, a fresh batch of sorbent might be used in a new cycle.

FIG. 2 contains a table showing the results of experiments on the sorption of Mo-99 and uranium from an irradiated uranium solution containing 80 g/l uranyl sulfate (pH=1). In the each sample, fifty column volumes of the sulfuric acid solution containing 80 g of uranium per liter of the reactor fuel were filtered through one column volume of sorbent at a rate of 10 column volumes per hour. The filtrate was continuously returned to the active zone of the reactor. Only the sorbent composition varied with each sample. In the first sorbent composition sample having only 5% mole $ZrO_2$, measurements showed that 70% of the Mo-99 was extracted to the inorganic sorbent phase while the uranium loss (degree of sorption) was 0.1%.

In the second sample, having a 40% mole $ZrO_2$ composition, 80% of the Mo-99 was extracted to the inorganic sorbent phase while the uranium loss was again 0.1%. Sample three had a similar sorbent composition to that of sample one except that the sorbent was saturated with 2 mg of U per cm$^3$. In this case, 90% of the Mo-99 was extracted and 0.05% of the uranium was lost to the sorbent. The fourth sorbent composition, similar to sample 2 but saturated with 40 mg of uranium per cm$^3$, resulted in the extraction of 95% of the Mo-99 and the loss of 0.05% uranium.

The present invention is, of course, in no way restricted to the specific disclosure of the specification and drawings, but also encompasses any modifications within the scope of the appended claims.

What we claim is:

1. A method for extracting molybdenum-99 from fission products produced in a uranyl sulfate homogeneous solution nuclear reactor, the method comprising:

pumping the uranyl sulfate solution through a column containing an inorganic sorbent comprised of hydrated titanium dioxide containing 5 to 40 mole percent of zirconium hydroxide in the form of pellets of about 0.1 to 2 mm in size with a specific surface area of 100 to 350 m$^2$/g until approximately 90 percent or more molybdenum-99 has been sorbed;

pumping compressed air through said inorganic sorbent column to force out residual uranyl sulfate solution;

pumping distilled water through the inorganic sorbent column to wash out residual uranyl sulfate solution;

washing said column with a sulfuric acid solution of approximately 0.1 M concentration, whereby any traces of uranium hydroxide precipitate are removed;

washing said inorganic sorbent column with an approximate 1.0 M nitric acid solution to desorb traces of uranium from the sorbent; and desorbing the molybdenum-99 from the sorbent by passing an approximate 3 to 5 M ammonia solution through said inorganic sorbent column.

2. The method of claim 1, wherein the sorbent is pre-saturated with a sulfuric acid solution of uranium at a concentration of 2 to 40 mg of uranium per cubic centimeter of the sorbent prior to use.

3. The method of claim 1, wherein the uranyl sulfate solution is pumped through the inorganic sorbent column at a rate of 2 to 20 column volumes per hour for a period of up to ten hours to thereby extract at least 90 percent of the molybdenum-99 from the residual uranyl sulfate solution.

* * * * *